Feb. 17, 1970     J. P. McCARTIN     3,495,470

SPHERICAL THREAD AND PIN GEAR REDUCTION

Filed April 3, 1968

INVENTOR.
JOSEPH P. McCARTIN

BY *Allison C. Collard*

United States Patent Office 3,495,470
Patented Feb. 17, 1970

3,495,470
SPHERICAL THREAD AND PIN GEAR REDUCTION
Joseph P. McCartin, 43—39 158th St.,
Flushing, N.Y. 11358
Filed Apr. 3, 1968, Ser. No. 718,533
Int. Cl. F16h 55/04
U.S. Cl. 74—425                 7 Claims

ABSTRACT OF THE DISCLOSURE

A compact right-angle gear reduction apparatus for transmitting a predetermined ratio of force to its output with respect to its input, consisting of an input member having a contoured radial thread which permits the multiple engagement of a plurality of cam followers to the threads so that loads requiring high torque may be driven.

---

Figure 1:
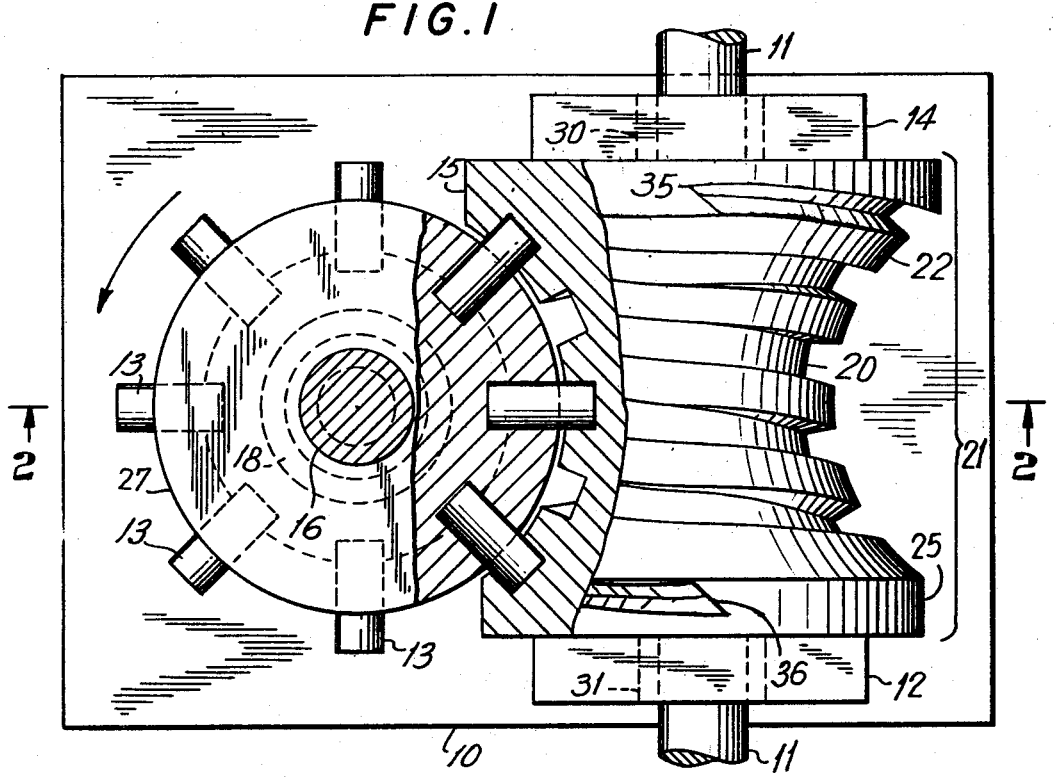

This invention relates to a compact and continuous motion right-angle reduction gear for use in precision machine tools.

More specifically, this invention relates to a right-angle radial thread drive having a high mechanical ratio with respect to its size for use in precision and high torque applications.

Conventional gear reduction drives used in machinery often produce excessive heat because of the mechanical wear and friction of the engaging elements. Moreover, the accuracy of conventional gear reduction drives deteriorates during use as a result of mechanical wear and thus causes undesirable backlash between the drive components. Right-angle reduction drives which are utilized in applications requiring high mechanical ratios between input and output components generally require an unusually large number of teeth which occupy large operating space particularly when used in processing or packaging machinery. The output torque of most of these conventional right-angle reduction drives is also limited because less than two teeth of the worm gear effectively engage the worm or thread wheel during any portion of their continuous operating cycle.

Accordingly, the present invention provides an improved right-angle gear ratio drive which utilizes a contoured, radial thread on its rotary member in order to permit the multiple engagement of a plurality of cam followers to the threads of the rotary member so that loads requiring high torque may be driven. Moreover, the apparatus according to the invention, permits the use of high mechanical ratios by the use of compact drive components. The rotary member which consists of a thread wheel has a circularly concave profile with an internal radius corresponding to the radius at the thread follower wheel so that a larger number of cam followers than found in conventional devices may be in continuous engagement with the thread wheel. Since a larger number of cam followers engage the thread wheel, high mechanical gear reductions may be achieved with negligible backlash between the components while being powered under high torque operating conditions.

It is therefore an object according to the present invention to provide a compact, right-angle gear ratio drive which produces continuous speed reduction and torque conversion with negligible friction and backlash.

It is another object according to the present invention to provide a right-angle gear ratio drive which permits the multiple engagement of cam followers to its rotary member.

It is another object according to the present invention to provide a right-angle gear reduction capable of driving loads requiring high torque.

It is still a further object according to the present invention to provide a right-angle gear reduction drive which overcomes many of the disadvantages of conventional gear reduction drives.

Other objects and features of the present invention will become apparent from the following detailed description considered in connection with the accompanying drawings which disclose one embodiment of the present invention. It should be understood, however, that the drawings are designed for the purpose of illustration only and not as a definition of the limits of the invention as to which reference should be made to the appended claims.

Figure 2:
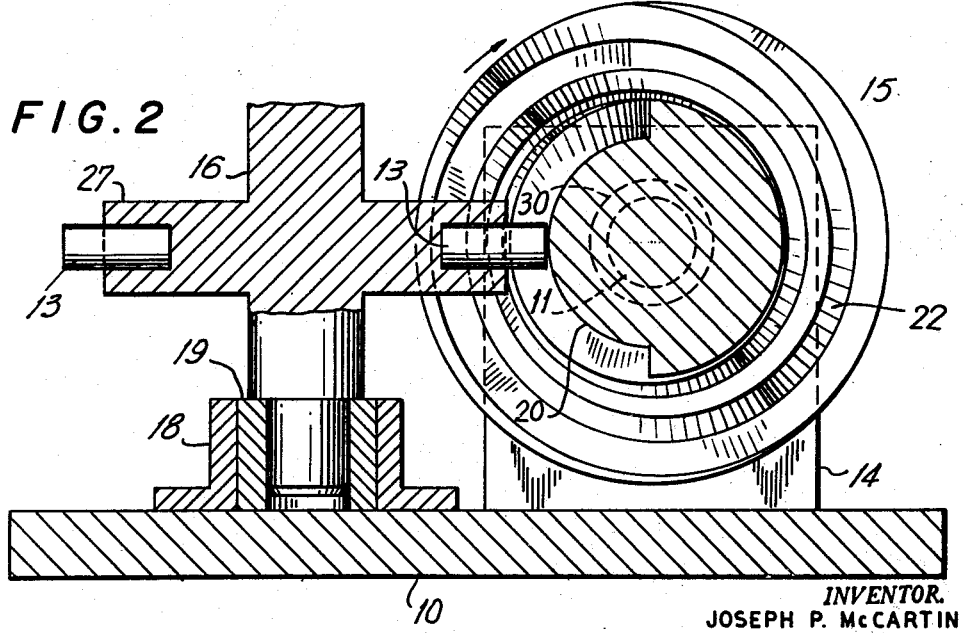

In the drawings wherein similar reference characters denote similar elements throughout the several views:

FIG. 1 is a top plan view of the gear reduction drive according to the invention; and FIG. 2 is a view taken along section 2—2 of FIG. 1.

Referring to the figures, there is shown mounted on stand 10 an input rotary member consisting of a thread wheel 21 mounted on drive shaft 11. Shaft 11 is trunnioned through bearings 30 and 31 in parallel, spaced-apart journal blocks 12 and 14. Thread wheel 21 includes end flanges 15 and 25 integrally formed therewith for supporting therebetween hub 20 having a circular concave profile. On the surface of hub 20 is a spiral thread 22 integrally formed in the body of hub 20 between end flanges 15 and 25.

A thread follower 27 is pivotably mounted at right-angles to thread wheel 21 on output shaft 16 and includes a plurality of radially spaced-apart cam followers 13 projecting from its periphery and in engagement with the contoured slots which are formed between adjacent segments of thread 22. Shaft 16 is pivotably mounted in thrust bearing 19 which is contained within flange 18 and secured to the surface of base 10.

Cam followers 13 may be pivotably retained within thread follower 27 by means of bushings or roller bearings (not shown) so that they may rotate freely when in contact with the sides of the contoured slots of thread wheel 21. The concave radial profile of thread wheel 21 permits the maximum engagement of cam followers 13 in the contoured slots between adjacent segments of threads 22. The hub surface 20 of each slot is prescribed in a circular profile with the locus of its center identical to that of the axis of thread follower 27. In a similar manner, the profile of the peripheral surfaces of thread segments 22 also form a circular cross-section having its center on the axis of thread follower 27. Moreover, cam followers 13 are directed in perpendicular engagement with the surface of hub 20 so that a plane passing through all of the axes of followers 13 will also include the axis of rotation of thread wheel 21. It is also obvious from the drawings that the axis of each of cam followers 13 converge on the axis of shaft 16.

In the embodiment shown, cam followers 13 are spaced at 45° intervals so that each complete rotation of thread wheel 21 will advance thread follower 27 $\frac{1}{16}$ of a revolution.

It is obvious that other thread ratios are possible with different spacings of the threads and cam followers. The clockwise rotation of thread wheel 21 as shown in FIG. 2 will cause thread follower 27 to advance smoothly and continuously in a clockwise direction as viewed in FIG. 1. During every second revolution of thread wheel 21, as shown in the embodiment, one cam follower 13 will exit from slot 35 in hub 15 defining one end of thread 22, while another cam follower will simultaneously enter slot 36 in flange 25, defining the opposite end of thread 22, and begin its engagement with thread wheel 21. Three cam followers of this embodiment thus remain in continuous engagement with thread wheel 21 during its operation, as shown in detail in the cross-sectional cutaway portion of FIG. 1.

It is obvious from the construction of the apparatus according to the invention that thread follower 27 may be advanced either clockwise or counterclockwise for either direction of rotation of thread wheel 21 since the components are symmetrically designed. Moreover, as shown in FIG. 1, thread 22 and the spiral contoured slot on hub 20 are constructed approximately equal in width to accommodate pin followers 13. The multiple engagement of cam followers 13 with thread wheel 21 permits the movement of loads having high torque requirements. Moreover, the circular contour of hub 20 which permits thread follower 27 to be moved closer to the axis of rotation of wheel 21 than in conventional designs, results in a more compact gear reduction apparatus. Furthermore, the full and precise engagement of cam followers 13 into the slots between thread segments 22 of hub 20 significantly reduces the friction between the cam followers and thread wheel 21 to permit long life and efficient operation of the gear reduction components.

While only a single embodiment of the present invention has been shown and described, it will be understood that many changes and modifications may be made thereunto without departing from the spirit and scope of the invention as defined by the appended claims.

What is claimed is:
1. A gear reduction apparatus for transmitting a predetermined ratio of force to its output with respect to its input comprising:
   a rotary input member having a circular concave surface,
   a circularly concave spiral thread formed integrally in said surface defining a spiral groove, said spiral groove and thread being approximately equal in width,
   an output rotary member, and
   a plurality of pin followers pivotably retained in radially spaced apart relationship on the periphery of said rotary output member, the axis of said pin followers being disposed along the same plane as the axis of said input member.

2. The apparatus as recited in claim 1 wherein the axis of said input member is perpendicular to the axis of rotation of said output member.

3. The apparatus as recited in claim 2 wherein the locus of the axis of the circular concave surface of said input member is coaxial with the axis of said output member.

4. The apparatus as recited in claim 3 wherein said cam followers are radially spaced at 45° intervals on said output member and in engagement with alternate grooves of said input member so that each rotation of said input member advances said output member $\frac{1}{16}$ of a revolution.

5. The apparatus as recited in claim 4 wherein two or more cam followers are in continuous engagement with the grooves of said input member at all times.

6. The apparatus as recited in claim 5 wherein said input member additionally comprises journal blocks positioned at the ends of the hub, and thrust bearings secured in said blocks for providing pivotal support to said input member and to restrict axial movement thereof.

7. The apparatus as recited in claim 5 wherein said spiral thread terminates at both ends of said hub along the same plane which includes the axis of said input member.

References Cited

UNITED STATES PATENTS

| 1,273,533 | 7/1918 | Pfahler | 74—464 |
| 1,421,580 | 7/1922 | Seemann | 74—458 |
| 1,790,606 | 1/1931 | Trbojevich | 74—458 |
| 2,714,315 | 8/1955 | Reader et al. | 74—458 X |

FOREIGN PATENTS

| 871,908 | 1/1942 | France. |

LEONARD H. GERIN, Primary Examiner

U.S. Cl. X.R.

74—415, 465